(12) United States Patent
Ni et al.

(10) Patent No.: US 11,101,491 B2
(45) Date of Patent: Aug. 24, 2021

(54) SEMICONDUCTOR STRUCTURES HAVING A MICRO-BATTERY AND METHODS FOR MAKING THE SAME

(71) Applicant: Taiwan Semiconductor Manufacturing Company, Ltd., Hsin-Chu (TW)

(72) Inventors: Chyi-Tsong Ni, Hsin-Chu (TW); I-Shi Wang, Taipei County (TW); Yi Hsun Chiu, Hsinchu County (TW); Ching-Hou Su, Hsinchu (TW)

(73) Assignee: TAIWAN SEMICONDUCTOR MANUFACTURING COMPANY, LTD., Hsin-Chu (TW)

( * ) Notice: Subject to any disclaimer, the term of this patent is extended or adjusted under 35 U.S.C. 154(b) by 242 days.

(21) Appl. No.: 16/449,522

(22) Filed: Jun. 24, 2019

(65) Prior Publication Data

US 2019/0312298 A1    Oct. 10, 2019

Related U.S. Application Data

(62) Division of application No. 14/994,279, filed on Jan. 13, 2016, now Pat. No. 10,361,449, which is a division of application No. 13/741,829, filed on Jan. 15, 2013, now Pat. No. 9,240,611.

(51) Int. Cl.
| | | |
|---|---|---|
| *H01M 10/04* | (2006.01) | |
| *H01M 6/40* | (2006.01) | |
| *H01M 10/0585* | (2010.01) | |
| *H01M 10/052* | (2010.01) | |
| *H01M 4/13* | (2010.01) | |
| *H01M 4/04* | (2006.01) | |
| *H01M 10/02* | (2006.01) | |

(52) U.S. Cl.
CPC ..... *H01M 10/0436* (2013.01); *H01M 4/0421* (2013.01); *H01M 4/13* (2013.01); *H01M 6/40* (2013.01); *H01M 10/02* (2013.01); *H01M 10/049* (2013.01); *H01M 10/052* (2013.01); *H01M 10/0585* (2013.01); *H01M 2010/0495* (2013.01); *H01M 2220/30* (2013.01); *Y10T 29/49114* (2015.01)

(58) Field of Classification Search
None
See application file for complete search history.

(56) References Cited

U.S. PATENT DOCUMENTS

| | | |
|---|---|---|
| 9,054,121 B2 | 6/2015 | Liu et al. |
| 9,444,398 B2 * | 9/2016 | Ni .................. H01M 10/46 |
| 9,444,938 B2 | 9/2016 | Slovacek |
| 2003/0164188 A1 | 9/2003 | Murai et al. |

(Continued)

*Primary Examiner* — Mounir S Amer
(74) *Attorney, Agent, or Firm* — Haynes and Boone, LLP

(57) ABSTRACT

The present disclosure provides an embodiment of an integrated structure that includes a first electrode of a first conductive material embedded in a first semiconductor substrate; a second electrode of a second conductive material embedded in a second semiconductor substrate; and a electrolyte disposed between the first and second electrodes. The first and second semiconductor substrates are bonded together through bonding pads such that the first and second electrodes are enclosed between the first and second semiconductor substrates. The second conductive material is different from the first conductive material.

20 Claims, 9 Drawing Sheets

(56) References Cited

U.S. PATENT DOCUMENTS

| | | |
|---|---|---|
| 2010/0233518 A1 | 9/2010 | Kwon et al. |
| 2012/0248615 A1 | 10/2012 | Chien et al. |
| 2013/0214400 A1* | 8/2013 | Shu .................... B81C 1/00261 257/682 |
| 2014/0199597 A1 | 7/2014 | Ni et al. |
| 2016/0009550 A1 | 1/2016 | Chien et al. |
| 2016/0126587 A1 | 5/2016 | Ni et al. |

* cited by examiner

SEMICONDUCTOR STRUCTURES HAVING A MICRO-BATTERY AND METHODS FOR MAKING THE SAME

PRIORITY DATA

The present application is a divisional application of U.S. patent application Ser. No. 14/994,279, filed Jan. 13, 2016, which is a divisional application of U.S. patent application Ser. No. 13/741,829, filed Jan. 15, 2013, each of which is incorporated herein by reference in its entirety.

BACKGROUND

The consumer electronic devices become thinner and the microelectronic systems become much smaller. The battery is a size-limiting factor to the consumer electronic devices. Hence, the micro batteries are widely used in a variety of fields, such as complementary metal-oxide-semiconductor (CMOS), and micro electro mechanical systems (MEMS), for miniaturization. For example, the micro electro mechanical systems (MEMS) have micro mechanic components, sensors, and actuators as autonomous complete systems and it needs to adapt micro batteries for power supply.

An existing method to fabricate fully solid batteries is to form a power storage device in a form of films and all the components of the micro battery, such as the current collectors, the positive and negative electrodes, and the solid electrolyte, are thin layers formed by a deposition scheme.

Micro batteries are often compared to thin film batteries. Generally, the thin film battery fabricating process does not combine the semiconductor packaging techniques for leveraging silicon technologies made in semiconductor fabricating process over the past decades.

Another concerned issue is that most micro batteries are formed in planar shape. Depending on the used materials, the operating voltage of micro battery is between 1 V and 4 V and the value of the operating voltage is limited for certain applications, for example, sensors or actuators require operating voltages higher than several tens of volts. Besides, there is another limiting factor for application wherein the surface capacity of a fully solid micro battery is in a range of several 10 $\mu Ah/cm^2$ to several hundreds $\mu Ah/cm^2$ and it is too low to use.

Mini batteries sold on the current market and fabricated with a coating techniques have a thickness comprised between 300 µm and 650 µm with a surface capacity of a few $mAh/cm^2$. Although the surface capacity of the mini batteries is much greater than that of a micro battery, the thickness disables them to be integrated on an integrated circuit (IC).

Therefore, there is a need for a micro battery structure and a method making the same to address the above deficiencies/issues.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
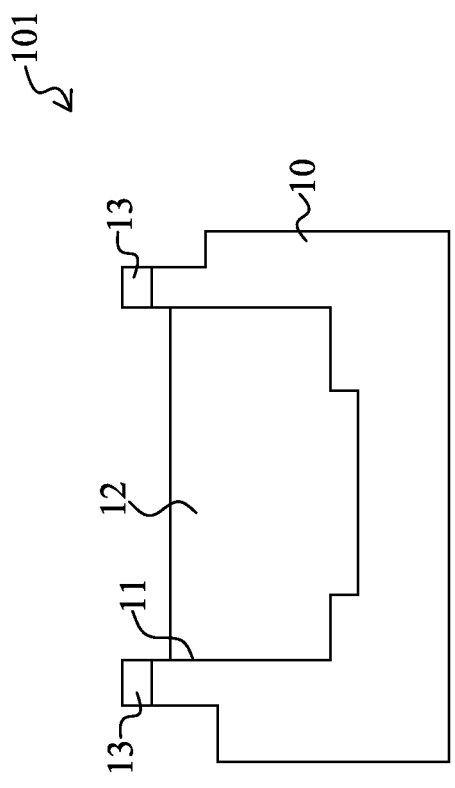
FIGS. 1 to 7 are schematic views of a micro-battery structure at various fabrication stages in accordance with the present disclosure in one or more embodiment.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Furthermore, descriptions of a first layer "on," "overlying," (and like descriptions) a second layer includes embodiments where the first and second layers are in direct contact and those where one or more layers are interposing the first and second layer.

Figure 2:
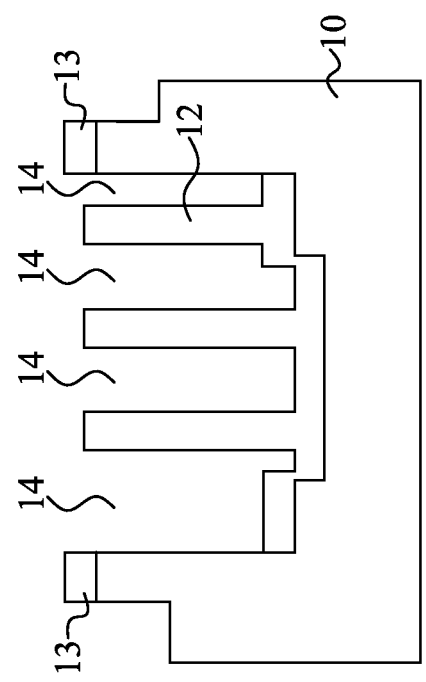
Figure 3:
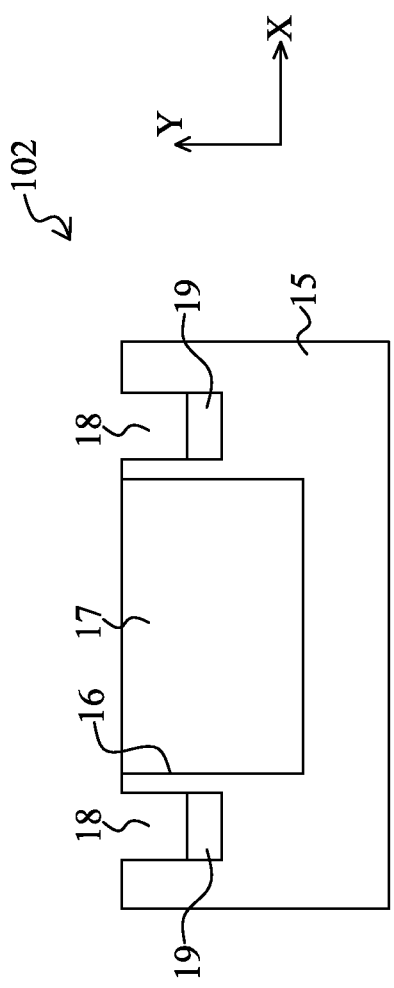
Figure 4:
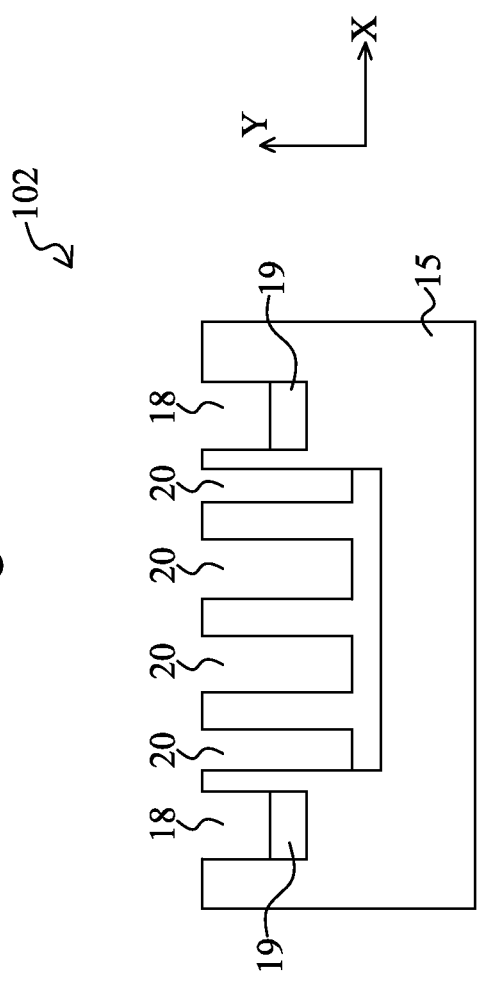
Figure 5:
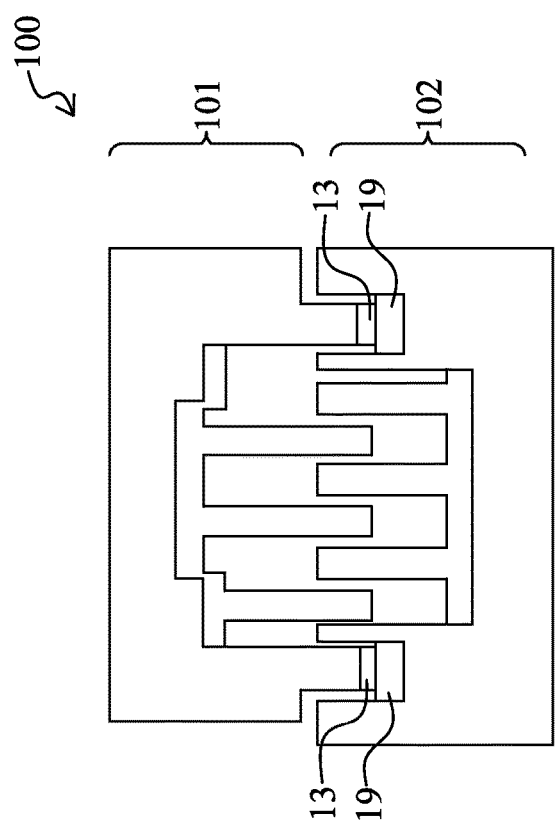
Figure 6:
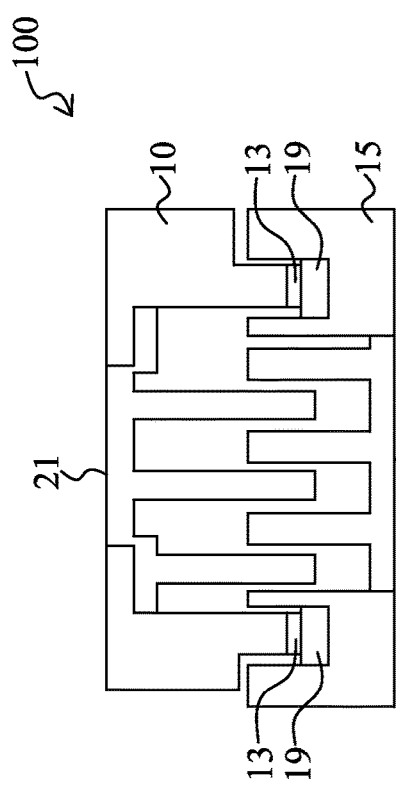
Figure 7:
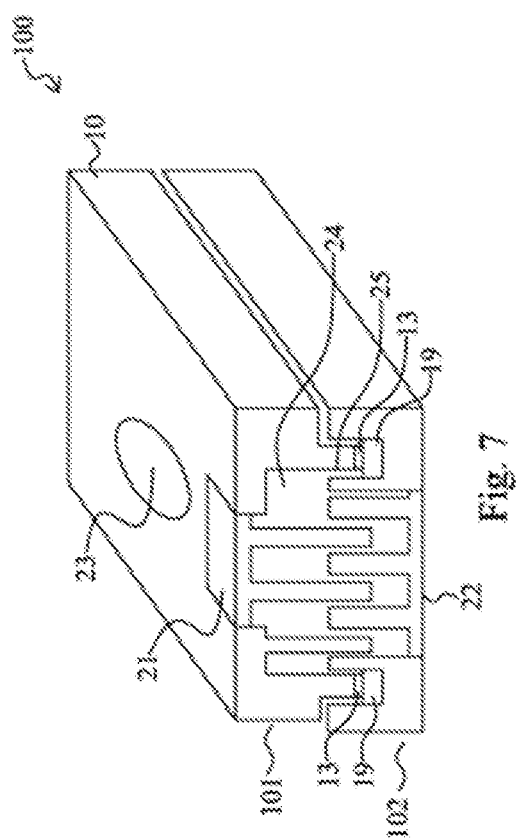
Figure 13:
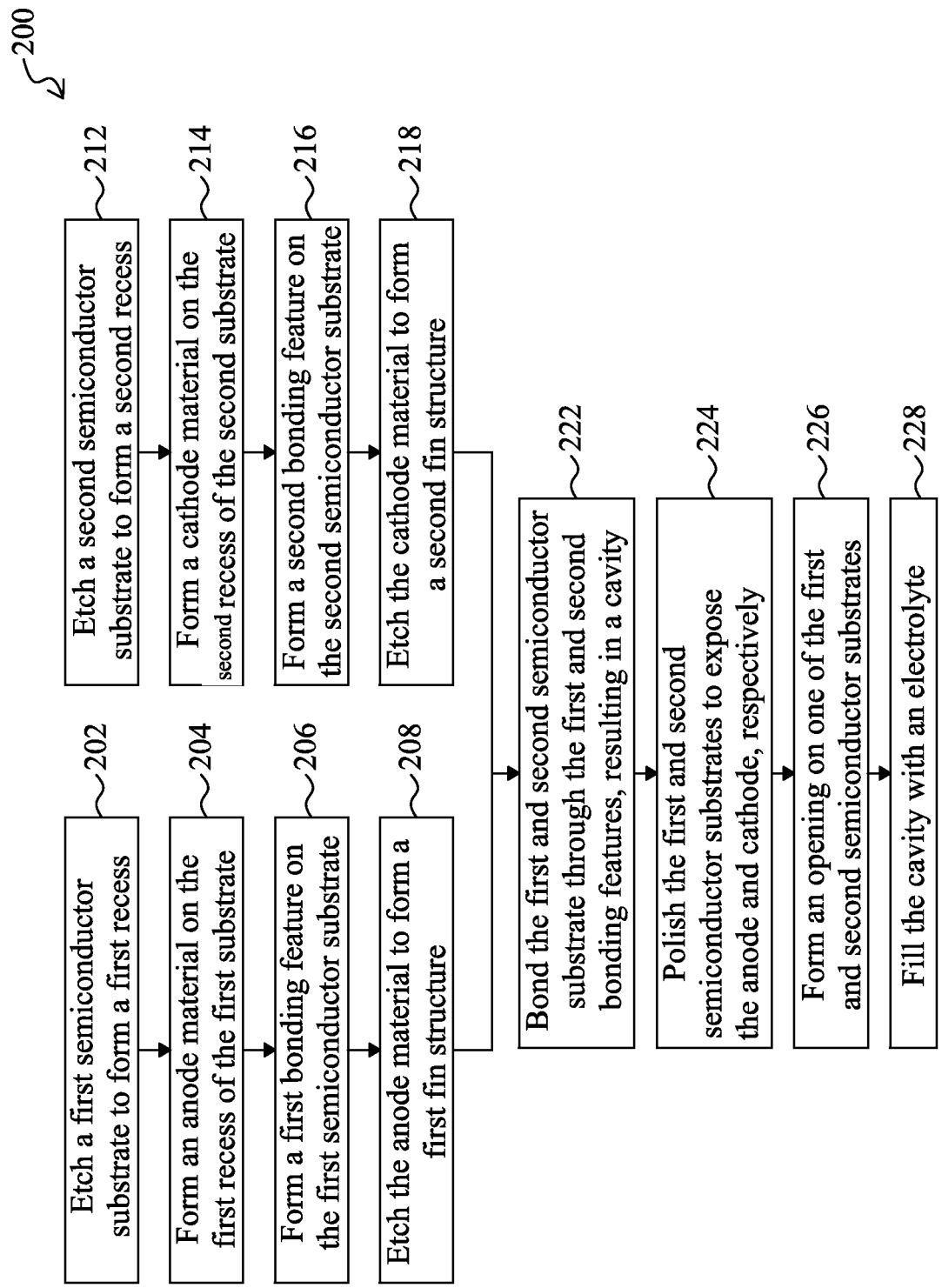
FIG. 13 is a flow chart illustrating a semiconductor fabricating process forming a micro-battery structure in accordance with the present disclosure in one or more embodiment.

FIGS. 1 to 7 are schematic views of a micro-battery structure 100 at various fabrication stages in accordance with the present disclosure in one or more embodiment. FIG. 13 is a flow chart illustrating a semiconductor fabricating process method 200 making the micro-battery structure 100 in accordance with the present disclosure in one or more embodiment. Particularly, FIGS. 1 and 2 illustrate a first electrode structure 101 at various fabrication stages. FIGS. 3 and 4 illustrate a second electrode structure 102 at various fabrication stages. FIGS. 5, 6 and 7 illustrates the micro-battery structure 100 at various fabrication stages. Especially, the micro-battery structure 100 is formed on a semiconductor structure integrated with other devices and components such as integrated circuit devices and/or micro-electromechanical system (MEMS) devices (even though these are not shown in the figures). In various examples, the integrated circuit devices include metal-oxide-semiconductor field-effect transistors (MOSFETs), diodes, imaging sensors, memory cells, resistors, capacitors, or combinations thereof. The method 200 includes various semiconductor fabrication operations compatible and integrated with the semiconductor fabrication process to form other semiconductor devices. The micro-battery structure 100 and the method 200 are collectively described with reference to FIGS. 1-7 and 13.

Referring to FIGS. 1 and 13, the method 200 begins with a first semiconductor substrate 10 for a cathode structure 101. The first substrate 10 includes a semiconductor substrate. In the present embodiment, the first substrate 10 includes a silicon (Si) substrate, such as a silicon wafer. In other embodiments, the first substrate 10 may additionally or alternatively include a semiconductor material selected from the group consisting of gallium arsenide (GaAs), gallium arsenide-phosphide (GaAsP), indium phosphide (InP), gallium aluminum arsenic (GaAlAs), indium gallium phosphide (InGaP), silicon carbide (SiC) and silicon germanium (SiGe).

The method 200 includes an operation 202 to form a first cavity (or a first recess) 11 in the first substrate 10. The operation 202 to form the first cavity 11 includes lithography process and etching. In one example, the lithography process includes resist coating, soft baking, exposing, post-exposure baking (PEB), developing, and hard baking. In another example, the etching may include a suitable etch process, such as wet etch, dry etch, or a combination thereof. In one embodiment, the operation 202 includes a lithography process to define a region for the cavity 11 using the patterned resist layer and an etch process is applied to the first substrate 10 to form the cavity using the patterned resist layer as an etch mask. In another embodiment, a hard mask is used as an etch mask. In this case, the hard mask is deposited and patterned by a lithography process and etch. Then another etch process is applied to the first substrate 10 through the openings of the hard mask to form the cavity 11.

In furtherance of the embodiment where the hard mask is used, the hard mask includes a dielectric material, such as silicon nitride (SiN), silicon oxide (SiO), silicon oxynitride (SiON) or a combination thereof. In one example, the hard mask includes a thermal silicon oxide film formed on the first substrate 10 and a SiN film formed on the thermal silicon oxide film. In furtherance of the example, the thermal silicon oxide film layer is formed by a thermal oxidation process and the SiN film is formed by a CVD process. The hard mask is further patterned to form one or more opening by a procedure including a lithography process and an etching process. Then, the hard mask is etched through the opening of the patterned resist layer, forming a patterned hard mask by the etching process. The patterned resist layer may be removed thereafter using a suitable process, such as wet stripping or plasma ashing. In one example, the etching process includes applying a dry (or plasma) etch to etch the hard mask within the opening of the patterned resist layer. In another example, the etching process includes applying a plasma etch to remove the SiN film within the opening of the patterned photoresist layer, and a wet etch with a hydrofluoric acid (HF) solution to remove the SiO film within the opening of the patterned resist layer.

The operation 202 may include more than one procedure of lithography process and etch to form the cavity 11 with proper profile. In the present embodiment, the cavity 11 includes two regions with respective depths. In furtherance of the embodiment, the cavity 11 includes a first region with a first depth and a second region with a second depth. The second region is surrounding the first region and the second depth is less than the first depth. The difference between the first and second depths is designed such that the final thickness of the first electrode 12 in the first region has a thickness with proper mechanical strength for holding an electrolyte inside an enclosed cavity. In this case, a first procedure including lithography process and etch is designed to etch the first substrate 10 in the first and second regions to the second depth. A second procedure including lithography process and etch is designed to further etch the first substrate 10 in the first region such that to reach the first depth.

Still referring to FIGS. 1 and 13, the method 200 includes an operation 204 to form a first electrode 12 in the first cavity 11. In the present embodiment, the first electrode 12 is a cathode. At the operation 204, a first conductive material is deposited to substantially fill in the first cavity 11 of the first substrate 10 by a suitable deposition scheme. The deposition scheme may include physical vapor deposition (PVD), chemical vapor deposition (CVD) or other suitable technology. The first conductive material for the first electrode (the cathode in the present embodiment) includes a conductive material selected from the group consisting of $LiCoO_2$, $LiMn_2O_4$, $LiNiCoMnO_2$, $LiNiO_2$, $CuO_2$ and $PbO_2$. In one example, the operation 204 may further include lithography process and etch to remove the first conductive material from other regions of the first substrate 10.

Still referring to FIGS. 1 and 13, the method 200 includes an operation 206 to form a first bonding pad (or a first bonding feature) 13 on the first substrate 10 in a bonding region adjacent to the cavity 11. In one embodiment, the first bonding pad includes a first bonding material suitable for bonding purpose according a suitable bonding technology. In various embodiments, the bonding technology includes eutectic bonding or diffusion bonding that is able to achieve desired sealing effect of a micro-battery cell. Other bonding technology may be used in other embodiments. In one embodiment, the first substrate 10 is patterned to form a protruding feature and the first bonding feature 13 is disposed on the protruding feature of the first substrate 10. In one example, the protruding feature is formed by a procedure that includes lithography process and etch. In another example, the procedure to form the protruding feature is integrated with the procedure to form the cavity 11. In one embodiment, the first bonding pad 13 is formed by deposition and patterning. The deposition of the first bonding material for the first bonding pad 13 may include CVD, PVD or other suitable technique. The patterning of the first bonding pad 13 includes lithography process and etch to remove the first bonding material from regions other than the bonding region. The first bonding pad 13 will be further described in terms of bonding technology, composition and formation when a second bonding feature is introduced and when the bonding operation is described.

Referring to FIGS. 2 and 13, the method 200 includes an operation 208 to pattern the first electrode 13 to form a first fin structure. After the operation 208, the first electrode 13 includes a first plurality of trenches 14 and a first plurality of fins each defined between two adjacent trenches. Therefore, this structure of the first electrode 12 is also referred to as the first fin structure. The first fin structure is formed by another procedure that includes lithography patterning and etch. The lithography patterning forms a patterned resist layer with openings to define trench regions. The etch, such as a dry plasma etch, is subsequently implemented to etch the first conductive material of the first electrode 12 descending and stopping at a predetermined depth, so as to form the first plurality of trenches 14 and the portion of the first electrode 12 in the first region has an enough thickness for proper mechanical strength.

In another embodiment, the first conductive material in other non-electrode regions may be alternatively removed during the operation 208. More specifically, the etch mask (patterned resist layer or hard mask) includes openings for the trenches 14 and other openings for the non-electrode regions. Thus, during the following etch process, the trenches 14 are formed and the first conductive material in the non-electrode regions is removed as well.

In the method 200, the operations 212 through 218 are employed to form a second electrode structure 102 in a second substrate. The operations 212 through 218 are similar to the operations 202 through 208. However, formed is the second electrode structure 102 that is different form the first electrode structure 101 in terms of composition and configuration. The first formation procedure (operations 202 through 208) to form the first electrode structure 101 and the second formation procedure (operation 212 through 218) to form the second electrode structure may be executed in parallel or in any proper sequence where the two procedures may be independently implemented. In an alternative embodiment, the first and second electrode structures are formed in a same substrate by an integrated process flow. Afterward, the first and second electrode structures are separated by a proper mechanism, such as dicing.

More particularly, the second procedure to form the second electrode structure 102 begins with a second substrate 15. In the present embodiment, the second electrode is an anode. The second substrate 15 is similar to the first substrate 10 and is a semiconductor substrate. In the present embodiment, the second substrate 15 includes a Si substrate, such as a silicon wafer. In other embodiments, the second substrate 15 may additionally or alternatively include other semiconductor material, such as those used in the first substrate 10 described in one or more embodiment.

Referring to FIGS. 3 and 13, the method 200 includes an operation 212 to form a second cavity (or a second recess) 16 in the second substrate 15. The operation 212 to form the second cavity 16 includes lithography process and etching, which is similar to the operation 202. In one embodiment, the operation 212 includes a lithography process to define a region for the cavity 16 using the patterned resist layer and an etch process is applied to the second substrate 15 to form the cavity using the patterned resist layer as an etch mask. In another embodiment, a hard mask is used as an etch mask. The operation 212 may include more than one procedure of lithography process and etch to form the cavity 16 with proper profile.

Still referring to FIGS. 3 and 13, the method 200 includes an operation 214 to form a second electrode 17 in the second cavity 16. In the present embodiment, the second electrode 17 is an anode. At the operation 214, a second conductive material is deposited in the second cavity 16 of the second substrate 15 by a suitable deposition scheme. The deposition scheme may include PVD, CVD or other suitable technology. The second conductive material for the second electrode (the anode in the present embodiment) includes a conductive material selected from the group consisting of graphite, hard carbon, soft carbon, $Li_4Ti_5O_{12}$, Al, Zn, $MnO_4$ and Pb. In one example, the operation 214 may further include lithography process and etch to remove the second conductive material from other regions of the second substrate 15.

The second electrode 17 includes a width W spanning in a first direction (X direction) and includes a thickness T spanned in a second direction (Y direction) perpendicular to the first direction. In the present embodiment, the width is substantially greater than the thickness T. In one example, the width W ranges between about 2*T and about 3*T.

Still referring to FIGS. 3 and 13, the method 200 includes an operation 216 to form a second bonding pad (or a second bonding feature) 19 on the second substrate 10 in a bonding region adjacent to the cavity 16. Especially, the bonding region of the second substrate 15 is designed to be aligned with the bonding region of the first substrate when they are bonded together at later fabrication stage.

In one embodiment, the second substrate 15 is patterned to form a trench 18 in the corresponding bonding region of the second substrate 15 and the second bonding feature 19 is disposed in the trench 18. The trench 18 is designed with dimensions such that the protruding feature of the first substrate 10 is partially positioned in the trench 18 when the two substrates are bonded together. In one example, the trench 18 is formed by a procedure that includes lithography process and etch. In another example, the procedure to form the trench 18 is integrated with the procedure to form the cavity 16.

In one embodiment, the second bonding pad 19 is formed by deposition and patterning. The deposition of the second bonding material for the second bonding pad 19 may include CVD, PVD or other suitable technique. The patterning of the second bonding pad 19 includes lithography process and etch to remove the second bonding material from regions other than the corresponding bonding region.

In another embodiment, the second bonding pad 19 includes a second bonding material suitable for bonding purpose according a suitable bonding technology. In one embodiment, the bonding technology includes eutectic bonding or diffusion bonding. Other bonding technologies may be alternatively utilized, such as transient liquid phase (TLP) bonding, thermo-compression bonding or fusion bonding. In compliance with the respective bonding technology according to various embodiments, the first bonding material for the first bonding pad 13 and the second bonding material for the second bonding pad 19 include a pair of bonding materials selected from the group consisting of Al/Si, Al/Ge, AlCu/Ge, Au/Si, Au/Ge, Au/Sn, Cu/Sn, Au/In, Ag/Sn, Cu/Cu, Al/Al, Au/Au, Si/Si, SiO2/SiO2 and Si/SiO2.

Referring to FIGS. 4 and 13, the method 200 includes an operation 218 to pattern the second electrode 17 to form a second fin structure. After the operation 218, the second electrode 17 includes a second plurality of trenches 20 and a second plurality of fins each defined between two adjacent trenches. The corresponding structure of the second electrode 17 is also referred to as the second fin structure. The second fin structure is formed by another procedure that includes lithography patterning and etch, which is similar to the one used to form the first fin structure. Particularly, the procedure includes a lithography process and an etch process. As illustrated in FIG. 4, the etch process is implemented to etch the second conductive material descending to stop at a target thickness, so as to form the second plurality of trenches 20. Furthermore, the first and second fin structures are designed to be interdigitated with each other when the first substrate 10 and the second substrate 15 are bonded together at the following stage.

The fin structure of the second electrode 17 includes a base portion and a fin portion that has a plurality of fins on the base portion. The base portion has a first thickness T1 in the second direction (Y direction) and the fin portion has a second thickness T2. Accordingly, T is related to T1 and T2 by T=T1+T2. In the present embodiment, T1 is substantially equal to T2 and is about half of the total thickness T.

After the formations of the first electrode structure 101 and the second electrode structure 102, the method 200 proceeds to the operations to assembly the first electrode structure 101 and the second electrode structure 102 and further complete the formation of the micro-battery structure 100.

Referring to FIGS. 5 and 13, the method 200 includes an operation 222 to bond the first substrate 10 and the second substrate 15 together through the first bonding pad 13 and the second bonding pad 19. Especially, the first bonding pad 13 and the second bonding pad 19 are aligned, directly contacted and bonded using a suitable bonding technology. In one embodiment, the bonding technology includes eutectic bonding or diffusion bonding. In another embodiment, the bonding technology is a hybrid bonding that utilizes more than one bonding mechanisms integrated together. For example, the first bonding pad 13 and the second bonding pad 19 each include a plurality of domains paired with a first subset for a first bonding mechanism (such as eutectic bonding) and a second subset for a second bonding mechanism (such as diffusion bonding).

In other embodiments, the bonding technology may alternatively utilize TLP bonding, thermo-compression bonding or fusion bonding. In furtherance of the various embodiments, When an eutectic bonding technology is used, the first bonding material for the first bonding pad 13 and the second bonding material for the second bonding pad 19 include a pair of bonding materials Al/Si, Al/Ge, AlCu/Ge, Au/Si, Au/Ge or Au/Sn. When a TLP bonding technology is used, the first bonding material for the first bonding pad 13 and the second bonding material for the second bonding pad 19 include a pair of bonding materials Cu/Sn, Au/In or Ag/Sn. When a thermo-compression bonding technology is used, the first bonding material for the first bonding pad 13 and the second bonding material for the second bonding pad 19 include a same bonding material for both, such as Cu, Al or Au. When a fusion bonding technology is used, the bonding materials include silicon, such as p-type doped silicon, n-type doped silicon or non-doped silicon. In more particular examples, the first bonding material for the first bonding pad 13 and the second bonding material for the second bonding pad 19 include a pair of bonding materials Si/Si, SiO2/SiO2 and Si/SiO2.

In yet other embodiments, the corresponding bonding technology may include an anodic bonding process, a vacuum bonding process, an adhesive bonding process, an enhanced bonding process, a plasma activation bonding process, a diffusion bonding process or a direct bonding process.

At the operation 222, the two substrates are bonded and the two cavities (11 and 16) are aligned to form an enclosed cavity between the two substrates. The first electrode 12 and the second electrode 17 are disposed in the enclosed cavity. Furthermore, the first electrode 12 and the second electrode 17 are configured such that the first fin structure of the first electrode 12 and the second fin structure of the second electrode 17 are interdigitated with each other.

Referring to FIGS. 6 and 13, the method 200 includes an operation 224 that thins down the first and second substrates to expose the first and second electrodes, respectively. Each of the first and second substrates is thinned down such that the corresponding electrode is exposed for further electrical routing. In FIG. 6, in order to expose a cathode contact 21 and an anode contact 22, the excess portions of the first substrate 10 and the second substrate 15 are removed by a chemical mechanical polishing (CMP) process, an etching process or other suitable technique, so as to reveal the cathode contact 21 and the anode contact 22 buried in the respective first and second substrates 10 and 15. The cathode contact 21 and the anode contact 22 are designed with proper dimensions.

Referring to FIGS. 7 and 13, the method 200 includes an operation 226 by forming an opening (also referred to as pore) 23 in one of the first and second substrate where the opening 23 is accessible to the enclosed cavity. In one example illustrated in FIG. 7, the opening 23 is formed on the back side of the first substrate 10 by a suitable procedure such as lithography patterning and etch.

Still referring to FIGS. 7 and 13, the method 200 includes an operation 228 to subsequently implement a filling scheme for filling an electrolyte material 24 through the opening 23 into the enclosed cavity (or chamber) 25 between the cathode structure 101 and the anode structure 102. In one embodiment, the electrolyte material 24 includes polymer electrolyte polyvinyl acetate (PVAc). In furtherance of the embodiment, the PVAc is filled in the enclosed cavity 25 in a pre-gel solution and is subsequently cross-linked into a gel by a suitable technique, such as at an elevated temperature.

In other embodiments, the electrolyte material 24 includes $NH_4Cl$, $ZnCl_2$, $H_2SO_4$ or the like. In the situation where the electrolyte material remains in a liquid state after being filled in the cavity 25, a sealing process is implemented to seal the opening 23 so that the electrolyte material in the cavity 25 will not leak out. The sealing process uses a suitable sealing mechanism, such as using viscous sealant and subsequently curing the sealant.

Figure 8:
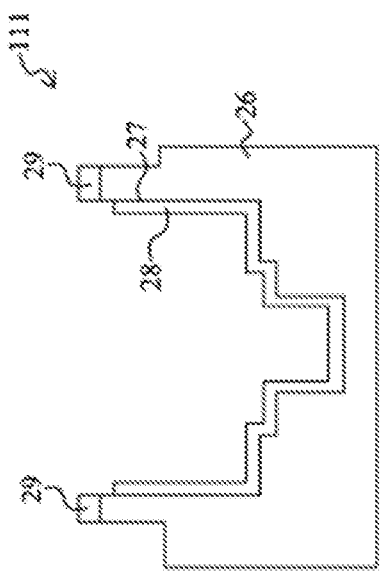
FIGS. 8 to 12 are schematic views of a micro-battery structure at various fabrication stages in accordance with the present disclosure in other one or more embodiment.
Figure 9:
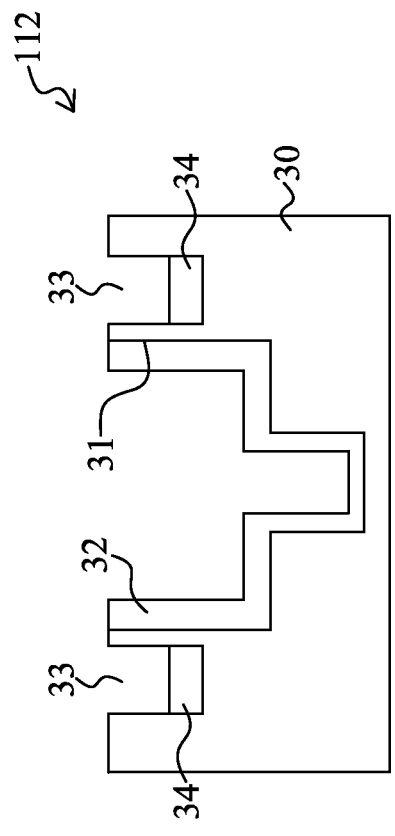
Figure 10:
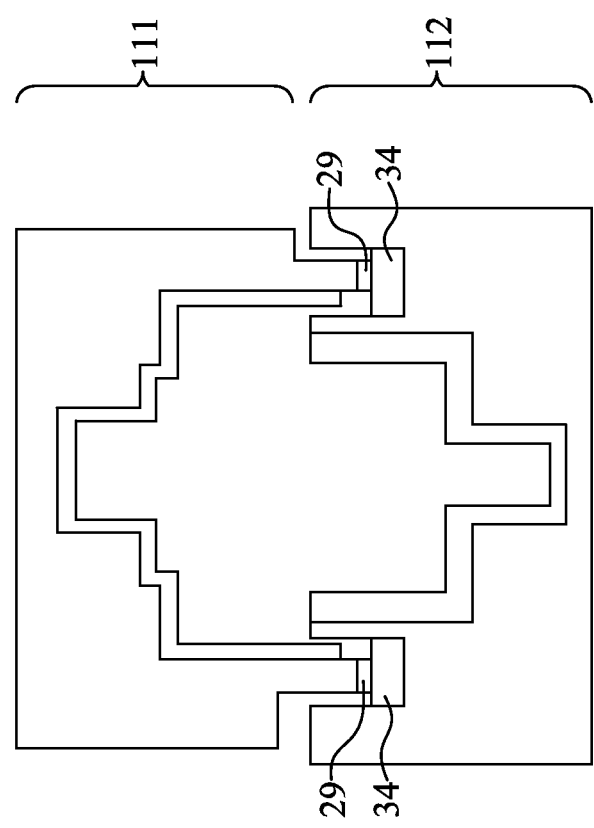
Figure 11:
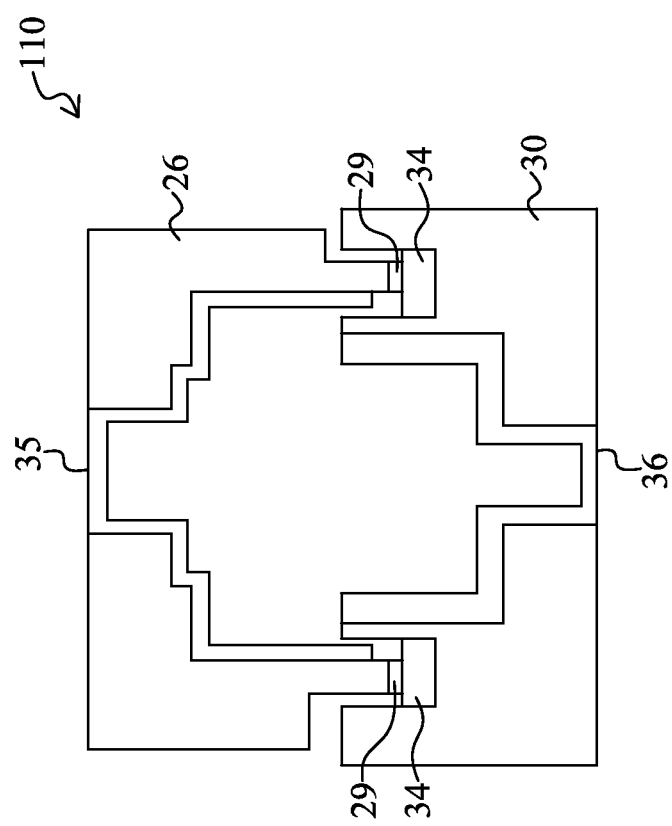
Figure 12:
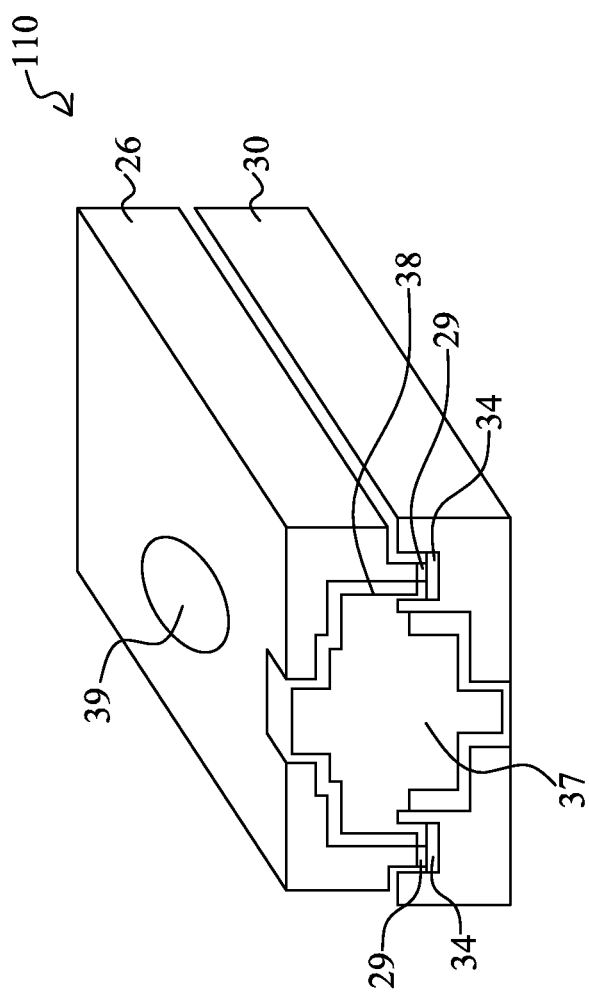
Figure 14:
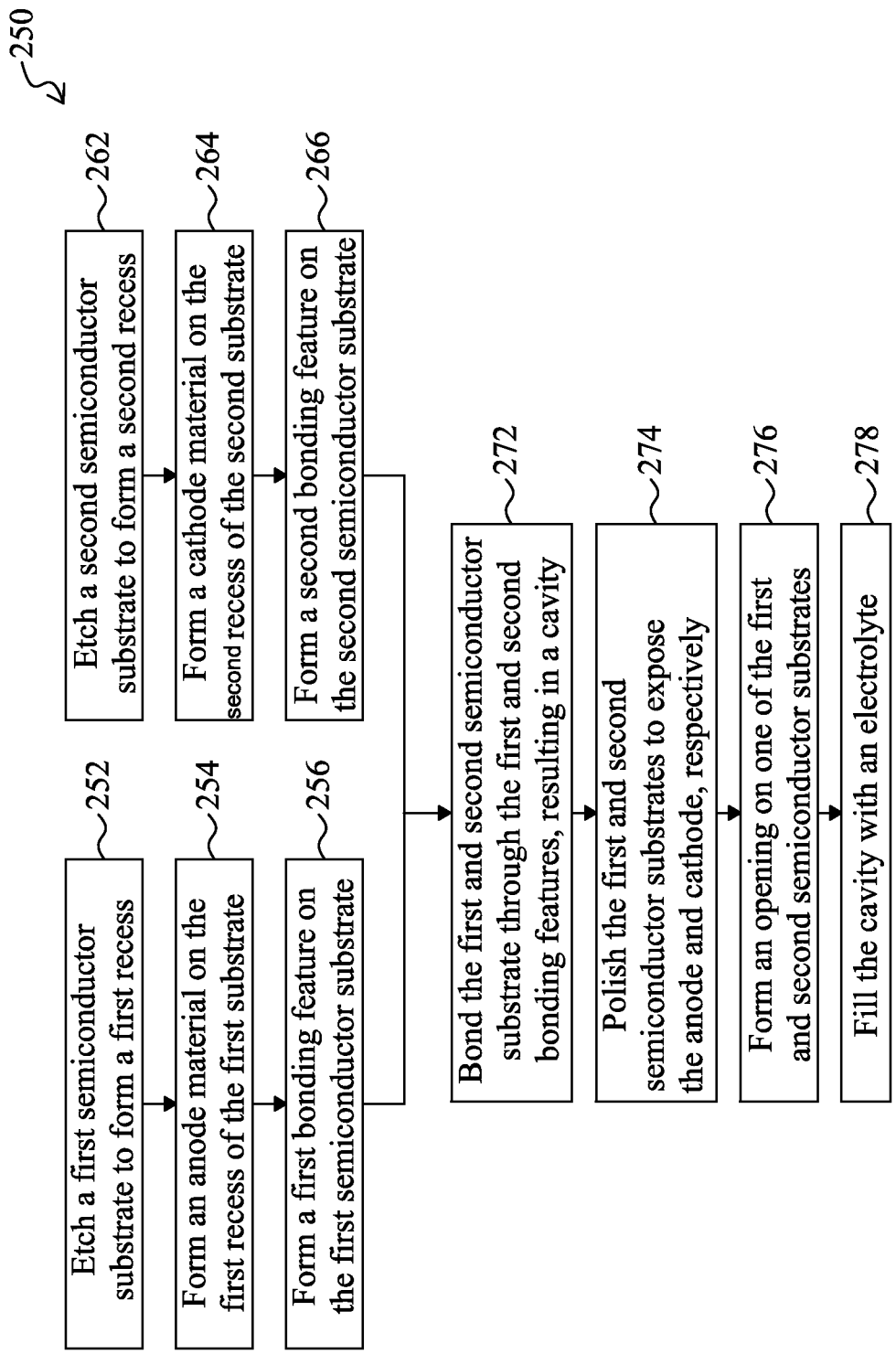
FIG. 14 is a flow chart illustrating a semiconductor fabricating process forming a micro-battery structure in accordance with the present disclosure in other one or more embodiment.

FIGS. 8 to 12 are schematic views of a micro-battery structure 110 at various fabrication stages in accordance with the present disclosure in another embodiment. FIG. 14 is a flow chart illustrating a semiconductor fabricating process method 250 making the micro-battery structure 110 in accordance with the present disclosure in one or more embodiment. Particularly, FIG. 8 illustrates a first electrode structure 111. FIG. 9 illustrates a second electrode structure 112. FIGS. 10, 11 and 12 illustrate the micro-battery structure 110 at various fabrication stages. Especially, the micro-battery structure 110 is formed on a semiconductor structure integrated with other devices and components such as integrated circuit devices and/or MEMS devices (even though these are not shown in the figures). In various examples, the integrated circuits devices and components include MOSFETs, diodes, imaging sensors, memory cells, resistors, capacitors, or combinations thereof. The method 250 includes various semiconductor fabrication operations compatible and integrated with the semiconductor fabrication process to form other semiconductor devices. The micro-battery structure 110 and the method 250 are collectively described with reference to FIGS. 8-12 and 14. The similar descriptions for the similar features and processes are not repeated here for simplicity.

Referring to FIGS. 8 and 14, the method 250 begins with a first semiconductor substrate 26 for a cathode structure 111. The first substrate 26 is similar to the first substrate 10 and includes a semiconductor substrate. In the present embodiment, the first substrate 26 includes a silicon substrate, such as a silicon wafer.

The method 250 includes an operation 252 to form a first cavity (or a first recess) 27 in the first substrate 26. The operation 252 to form the first cavity 27 is similar to the operation 202 and includes lithography process and etching in the present example.

Particularly, the operation 252 may include more than one procedure of lithography process and etch to form the cavity 27 with proper profile. In the present embodiment, the cavity 27 includes two regions with respective depths. In furtherance of the embodiment, the cavity 27 includes a first region with a first depth and a second region with a second depth. The second region is surrounding the first region and the second depth is less than the first depth. The difference between the first and second depths is designed such that the final thickness of a to-be-formed electrode in the first region has a thickness with proper mechanical strength for holding an electrolyte inside an enclosed cavity. In this case, a first procedure including lithography process and etch is designed to etch the first substrate 26 in the first and second regions to the second depth. A second procedure including lithography process and etch is designed to further etch the first substrate 26 in the first region such that to reach the first depth.

Still referring to FIGS. 8 and 14, the method 250 includes an operation 254 to form a first electrode 28 in the first cavity 27. In the present embodiment, the first electrode 28 is a cathode. A first conductive material is deposited in the first cavity 27 of the first substrate 26 by a suitable deposition scheme. The first conductive material for the first electrode (the cathode in the present embodiment) includes a conductive material selected from the group consisting of $LiCoO_2$, $LiMn_2O_4$, $LiNiCoMnO_2$, $LiNiO_2$, $CuO_2$ and $PbO_2$. The operation 254 is similar to the operation 204. However, the first electrode 28 is not deposited in the first cavity 27 with a proper thickness and a profile conformal to the first cavity 27, as shown in FIG. 8.

Still referring to FIGS. 8 and 14, the method 250 includes an operation 256 to form a first bonding pad (or a first bonding feature) 29 on the first substrate 26 in a bonding region adjacent to the first cavity 27. The operation 256 is similar to the operation 206. The first bonding pad 29 is similar to the first bonding pad 13. In one embodiment, the first bonding pad 29 includes a first bonding material suitable for bonding purpose according a suitable bonding technology. In another embodiment, the first bonding feature 29 is formed on a protruding feature of the first substrate 26 in the bonding region.

The first electrode 28 is formed conformal to the first cavity 27 with a proper thickness by deposition, and may additionally include a procedure (such as lithography patterning and etch) to remove the first conductive material from other regions of the first substrate 26. The first electrode 28 is not further patterned. Accordingly, the operation 208 in the method 200 is eliminated in the method 250.

In the method 250, the operations 262 through 266 are employed to form a second electrode structure 112 in a second substrate 30. The operations 262 through 266 are similar to the operations 252 through 256. However, formed is the second electrode structure 112 that is different form the first electrode structure 111 in term of composition. The first formation procedure (operations 252 through 256) to form the first electrode structure 111 and the second formation procedure (operations 262 through 266) to form the second electrode structure may be executed in parallel or in any proper sequence where the two procedures may be independently implemented. In an alternative embodiment, the first and second electrode structures are formed in a same substrate by an integrated process flow. Afterward, the first and second electrode structures are separated by a proper mechanism, such as dicing.

More particularly, the second procedure to form the second electrode structure 112 begins with a second substrate 30. In the present embodiment, the second electrode 30 is an anode. The second substrate 30 is similar to the first substrate 26 and is a semiconductor substrate. In the present embodiment, the second substrate 30 includes a Si substrate, such as a silicon wafer. In other embodiments, the second substrate 30 may additionally or alternatively include other semiconductor material.

Referring to FIGS. 9 and 14, the method 250 includes an operation 262 to form a second cavity (or a second recess) 31 in the second substrate 30. The operation 262 to form the second cavity 31 includes lithography process and etching, which is similar to the operation 252. The operation 262 may include more than one procedure of lithography process and etch to form the cavity 31 with proper profile.

Still referring to FIGS. 9 and 14, the method 250 includes an operation 264 to form a second electrode 32 in the second cavity 31. In the present embodiment, the second electrode 32 is an anode. At the operation 264, a second conductive material is deposited in the second cavity 31 of the second substrate 30 by a suitable deposition scheme. The deposition scheme may include PVD, CVD or other suitable technology. The second conductive material for the second electrode (the anode in the present embodiment) includes a conductive material selected from the group consisting of graphite, hard carbon, soft carbon, $Li_4Ti_5O_{12}$, Al, Zn, $MnO_4$ and Pb. In one example, the operation 264 may further include lithography process and etch to remove the second conductive material from other regions of the second substrate 30.

Still referring to FIGS. 9 and 14, the method 250 includes an operation 266 to form a second bonding pad (or a second bonding feature) 34 on the second substrate 30 in a bonding region adjacent to the cavity 31. Especially, the bonding region of the second substrate 30 is designed to be aligned with the bonding region of the first substrate when they are bonded together at later fabrication stage.

In one embodiment, the second substrate 30 is patterned to form a trench 33 in the corresponding bonding region of the second substrate 30 and the second bonding feature 34 is disposed in the trench 33. The trench 33 is designed with dimensions such that the protruding feature of the first substrate 26 is partially positioned in the trench 33 when the two substrates are bonded together. In one example, the trench 33 is formed by a procedure that includes lithography process and etch. In another example, the procedure to form the trench 33 is integrated with the procedure to form the cavity 31.

In one embodiment, the second bonding pad 34 is formed by deposition and patterning. The second bonding feature 34 is similar to the bonding feature 19 in terms of composition, configuration and formation.

For example, the second bonding pad 34 includes a second bonding material suitable for bonding purpose according a suitable bonding technology. In one embodiment, the bonding technology includes eutectic bonding or diffusion bonding. Other bonding technologies may be alternatively utilized, such as TLP bonding, thermo-compression bonding or fusion bonding. In compliance with the respective bonding technology according to various embodiments, the first bonding material for the first bonding pad 29 and the second bonding material for the second bonding pad 34 include a pair of bonding materials selected from the group consisting of Al/Si, Al/Ge, AlCu/Ge, Au/Si, Au/Ge, Au/Sn, Cu/Sn, Au/In, Ag/Sn, Cu/Cu, Al/Al, Au/Au, Si/Si, SiO2/SiO2 and Si/SiO2.

After the formations of the first electrode structure 111 and the second electrode structure 112, the method 250 proceeds to the operations to assembly the first electrode structure 111 and the second electrode structure 112 and further complete the formation of the micro-battery structure 110.

Referring to FIGS. 10 and 14, the method 250 includes an operation 272 to bond the first substrate 26 and the second substrate 30 together through the first bonding pad 29 and the second bonding pad 34. Especially, the first bonding pad 29 and the second bonding pad 34 are aligned, directly contacted and bonded by a suitable bonding technology, which is similar to the bonding technology used for the bonding pads 13 and 19 in the micro-battery structure 100. In one embodiment, the bonding technology includes eutectic bonding, diffusion bonding or hybrid bonding. In other embodiments, the bonding technology may alternatively utilize TLP bonding, thermo-compression bonding or fusion bonding. In furtherance of the various embodiments, the first bonding material for the first bonding pad 29 and the second bonding material for the second bonding pad 34 include a pair of bonding materials similar to those used in the micro-battery structure. At the operation 272, the two substrates are bonded and the two cavities (27 and 31) are aligned to form an enclosed cavity between the two substrates. The first electrode 28 and the second electrode 32 are disposed in the enclosed cavity.

Referring to FIGS. 11 and 14, the method 250 includes an operation 274 that thins down the first and second substrates to expose the first and second electrodes, respectively, for further electrical routing. In FIG. 11, in order to expose a cathode contact 35 and an anode contact 36, the excess portions of the first substrate 26 and the second substrate 30 are removed by a CMP process, an etching process or other suitable technique, so as to reveal the cathode contact 35 and the anode contact 36 buried in the respective first and second substrates 26 and 30. The cathode contact 35 and the anode contact 36 are designed with proper dimensions for mechanical strength and other functional considerations.

Referring to FIGS. 12 and 14, the method 250 includes an operation 276 by forming an opening (also referred to as pore) 39 in one of the first and second substrate where the opening 39 is accessible to the enclosed cavity (or chamber) 38. In one example illustrated in FIG. 12, the opening 39 is formed on the back side of the first substrate 26 by a suitable procedure such as lithography patterning and etch.

Still referring to FIGS. 12 and 14, the method 250 includes an operation 278 to subsequently implement a filling scheme for filling an electrolyte material 37 through the opening 39 into the enclosed cavity 38 between the cathode structure 111 and the anode structure 112. In one embodiment, the electrolyte material 37 includes polymer electrolyte PVAc. In furtherance of the embodiment, the PVAc is filled in the enclosed cavity 38 in a pre-gel solution and is subsequently cross-linked into a gel by a suitable technique, such as at an elevated temperature.

In other embodiments, the electrolyte material 37 includes $NH_4Cl$, $ZnCl_2$, $H_2SO_4$ or other suitable electrolyte material. In the situation where the electrolyte material remains in a liquid state after being filled in the cavity 38, a sealing process is implemented to seal the opening 39 so that the electrolyte material in the cavity 38 is held in and will not leak out. The sealing process uses a suitable sealing mechanism, such as using viscous sealant and subsequently curing the sealant.

While the disclosure has been described in terms of what are presently considered to be the most practical and preferred embodiments, it is to be understood that the disclosure need not be limited to the disclosed embodiment. On the contrary, it is intended to cover various modifications and similar arrangements included within the spirit and scope of the appended claims, which are to be accorded with the broadest interpretation so as to encompass all such modifications and similar structures.

Other alternatives and modifications may present. In one embodiment, the micro-battery and the charge system are integrated to achieve consume device self-charge in time without using extra apparatus. In another embodiment, the two electrode structures of the micro-battery structure may be fabricated in a same silicon wafer by an integrated fabrication procedure, then separated by dicing and subsequently bonded together, with reduced fabrication cost and cycle time.

Various advantages and benefits may present in various embodiments of the present disclosure. In one embodiment, the micro-battery structure and the making the same are compatible with the silicon integrated circuit (IC) fabrication and are easy to be integrated into IC devices, such as complimentary metal-oxide-semiconductor field-effect transistor (CMOSFET) device and MEMS devices. In another embodiment, the disclosed metal bonding (such as diffusion bond or eutectic bond) can achieve perfect sealing of the micro-battery cell. In another embodiment, the micro-battery structure (such as 100 and 110) has small package and much light weight, and has extended device service life time. In yet another embodiment, the micro-battery structure 100 includes the electrodes having interdigitated fin structures that has larger reaction area and further increases the battery current.

Thus, the present disclosure provides an embodiment of an integrated structure that includes a first electrode of a first conductive material embedded in a first semiconductor substrate; a second electrode of a second conductive material embedded in a second semiconductor substrate; and a electrolyte disposed between the first and second electrodes. The first and second semiconductor substrates are bonded together through bonding pads such that the first and second electrodes are enclosed between the first and second semiconductor substrates. The second conductive material is different from the first conductive material.

The present disclosure provides another embodiment of a micro-battery structure that includes a first substrate having a first recess; a second substrate having a second recess and bonded with the first substrate such that the first and second recesses are aligned to form a cavity between the first and second substrates; an anode formed on the first substrate and disposed in the cavity; a cathode formed on the second substrate and disposed in the cavity; and a electrolyte in the cavity and distributed between the first and second electrodes. The anode includes first fin features, and the cathode includes second fin features interdigitated with the first fin features.

The present disclosure provides an embodiment of a method for forming a micro-battery structure. The method includes etching to form a first recess in a first substrate; forming an anode on the first recess of the first substrate; etching to form a second recess on a second substrate; forming a cathode on the second recess of the second substrate; bonding the first and second substrates together such that the first and second recesses are aligned to form a cavity between the first and second substrates, wherein the anode and cathode are enclosed in the cavity; and disposing an electrolyte in the cavity between the first and second substrates.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A micro-battery structure comprising:
   a first substrate having a first recess;
   a second substrate having a second recess and bonded with the first substrate such that the first and second recesses are aligned to form a cavity between the first and second substrates;
   an anode formed on the first substrate and disposed in the cavity;

a cathode formed on the second substrate and disposed in the cavity; and a electrolyte in the cavity and distributed between the anode and the cathode, wherein the anode includes first fin features, and the cathode includes second fin features interdigitated with the first fin features.

2. The micro-battery structure of claim 1, wherein each of the first and second substrates includes a silicon substrate, and wherein the anode includes a first conductive material; and the cathode includes a second conductive material different from the first conductive material.

3. The micro-battery structure of claim 2, wherein the first conductive material includes a material selected from the group consisting of graphite, graphitizable carbon, nongraphitizable carbon, lithium titanium oxide ($Li_4Ti_5O_{12}$), aluminum (Al), zinc (Zn), manganese oxide ($MnO_4$) and lead (Pb); and the second conductive material includes a material selected from the group consisting of $LiCoO2$, $LiMn2O4$, $LiNiCoMnO2$, lithium nickel dioxide ($LiNiO_2$), CuO2 and PbO2.

4. The micro-battery structure of claim 1, wherein the electrolyte includes a material selected from the group consisting of $NH_4Cl$, $ZnCl_2$, $H_2SO_4$ and polyvinyl acetate (PVAc) polymer gel.

5. The micro-battery structure of claim 1, wherein one of the first and second substrates includes an opening to the cavity.

6. The micro-battery structure of claim 1, wherein the first and second substrates are bonded together by a bonding technology selected from the group consisting of an anodic bonding process, a vacuum bonding process, an adhesive bonding process, an enhanced bonding process, a plasma activation bonding process, a diffusion bonding process, an eutectic bonding process and a direct bonding process.

7. The micro-battery structure of claim 1, wherein the first and second substrates are bonded together through a first bonding feature formed on the first substrate and a second bonding feature formed on the second substrate, wherein the first bonding feature and the second bonding feature include a pair of materials selected from the group consisting of Al/Si, Al/Ge, AlCu/Ge, Au/Si, Au/Ge, Au/Sn, Cu/Sn, Au/In and Ag/Sn.

8. A micro-battery structure comprising:

a first semiconductor substrate;

a second semiconductor substrate;

a first electrode disposed directly on the first semiconductor substrate such that the first electrode is positioned between the first semiconductor substrate and the second semiconductor substrate, the first electrode including first fin features;

a second electrode disposed directly on the second semiconductor substrate such that the second electrode is positioned between the first semiconductor substrate and the second semiconductor substrate, the second electrode including second fin features that are interdigitated with the first fin features; and a first bonding pad disposed within a trench defined by the first semiconductor substrate; and a second bonding pad disposed on a protruding feature of the second semiconductor substrate, wherein the protruding feature is disposed at least partially in the trench and the first bonding pad is bonded to the second bonding pad.

9. The micro-battery structure of claim 8, further comprising an electrolyte material disposed around the first fin features and the second fin features.

10. The micro-battery structure of claim 9, wherein the electrolyte includes and polyvinyl acetate (PVAc) polymer gel.

11. The micro-battery structure of claim 9, wherein the electrolyte includes a material selected from the group consisting of $NH_4Cl$, $ZnCl_2$, and $H_2SO_4$.

12. The micro-battery structure of claim 8, wherein the first electrode is exposed on a backside of the first semiconductor substrate, the first electrode disposed directly on a frontside of the first semiconductor substrate, and wherein the second electrode is exposed on a backside of the second semiconductor substrate, the first electrode disposed directly on a frontside of the second semiconductor substrate.

13. The micro-battery structure of claim 8, wherein the first semiconductor substrate and the second semiconductor substrate are formed of the same semiconductor material.

14. The micro-battery structure of claim 8, wherein the first semiconductor substrate defines a first recess and the first electrode is disposed within the first recess, and wherein the second semiconductor substrate defines a second recess and the second electrode is disposed within the second recess.

15. A micro-battery structure comprising:

a first substrate defining a first recess;

a second substrate defining a second recess;

a first electrode disposed within the first recess;

a second electrode disposed within the second recess; and a first bonding pad disposed within a trench defined by the first substrate; and a protruding feature of the second substrate defining a sidewall of the second recess; and a second bonding pad disposed on the protruding feature of the second substrate, wherein the protruding feature is disposed at least partially in the trench and the first bonding pad is bonded to the second bonding pad.

16. The micro-battery structure of claim 15, wherein a portion of the second electrode is disposed at least partially in the trench.

17. The micro-battery structure of claim 16, wherein the portion of the second electrode is disposed within the trench without extending to the first bonding pad and the second bonding pad.

18. The micro-battery structure of claim 15, wherein the first electrode includes a plurality of first fins, and wherein the second electrode includes a plurality of second fins.

19. The micro-battery structure of claim 15, wherein the first substrate has a first sidewall surface and an opposing second sidewall surface, wherein the first and second sidewall surfaces define the trench, and wherein the first bonding pad extends from the first sidewall surface to the second sidewall surface.

20. The micro-battery structure of claim 15, wherein the first substrate has a backside that includes an opening that exposes a portion of the first electrode, and wherein the second substrate has a backside that includes an opening that exposes a portion of the second electrode.

* * * * *